United States Patent Office 2,719,158
Patented Sept. 27, 1955

2,719,158

1-HYDRAZINO-ISOQUINOLINES

Jean Druey, Riehen, Switzerland, assignor to Ciba Pharmaceutical Products, Inc., Summit, N. J.

No Drawing. Application June 30, 1952,
Serial No. 296,483

Claims priority, application Switzerland July 6, 1951

5 Claims. (Cl. 260—286)

This invention relates to isoquinolines, containing in 1-position the hydrazino group or an N,N-methylenehydrazino group, for example, the N,N-methylmethylenehydrazino, N,N-dimethylmethylene-hydrazino, N,N-methylcarboxymethylene-hydrazino and N,N-phenylmethylenehydrazino group, and their acid salts. The isoquinoline moiety may contain substituents, for example alkyl groups, free or substituted hydroxyl groups, amino groups or halogen atoms.

The specified compounds possess valuable pharmacological properties. Thus they effect a prolonged reduction of the blood pressure. Of special value is 1-hydrazino-isoquinoline of the formula

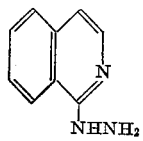

and its salts.

They can be used as remedy against high blood pressure. For this purpose they can be tableted in the usual manner for oral application. It is also possible to dissolve salts of the new isoquinolines in water and to fill them into ampules in sterile form for parenteral administration.

The said isoquinoline compounds are obtained when 1-halogen-isoquinolines are reacted with hydrazine. The following isoquinolines can, for example, be used as starting materials: 1-chloro-isoquinoline, 1-chloro-7-methyl-isoquinoline, 1,7-dichloro-isoquinoline or 1-chloro-7-methoxy-isoquinoline. The hydrazine can also be used in the form of its salts. The reaction is advantageously carried out in a diluent, if desired in the presence of a condensing agent, and it is also possible to work in the presence of a catalyst such as copper powder.

For the preparation of the 1-(N,N-methylenehydrazino)-isoquinolines, the isoquinolines containing in 1-position the hydrazino group may be reacted with an organic carbonyl compound, i. e. with an aldehyde or ketone for example, with formaldehyde, acetaldehyde, benzaldehyde, pyruvic acid, or acetone.

In so far as the starting materials necessary for carrying out the specified reactions have hitherto not been described, they can be obtained according to conventional methods.

Depending upon the method employed, the new hydrazinoisoquinolines are obtained in the form of the bases or salts. From the bases, e. g. by reaction with the acids suitable for the preparation of therapeutically useful salts, such as the hydrohalic acids, sulfuric acid, nitric acid, phosphoric acid, acetic acid, propionic acid, oxalic acid, malic acid, citric acid, methane sulfonic acid, ethane sulfonic acid, hydroxyethane sulfonic acid, benzoic acid, salicylic acid, p-amino-salicylic acid or toluic acid, the corresponding therapeutically useful salts are obtained, namely, the hydrohalides, sulfate, nitrate, phosphate, acetate, propionate, oxalate, malate, citrate, methane sulfonate, ethane sulfonate, hydroxy-ethane sulfonate, benzoate, salicylate, p-aminosalicylate or toluate.

The following examples illustrate the invention, the relation between part by weight and part by volume being the same as that between the gram and the cubic centimeter.

Example 1

10 parts by weight of 1-chloro-isoquinoline are heated in a closed vessel to 100–110° C. for 6 hours in a mixture of 25 parts by volume of hydrazine hydrate and 50 parts by volume of ethyl alcohol. After cooling, the reaction product which has crystallized out in the form of felted needles is filtered with suction. It consists of 1-hydrazino-isoquinoline of the formula

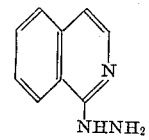

which is already practically in a pure state. The free base, for complete purification, may be recrystallized from ethyl acetate and then melts at about 172° C. The hydrochloride is obtained by dissolving 1 part by weight of 1-hydrazino-isoquinoline in 10 parts by volume of 2-normal HCl with heating, and crystallizing by cooling. It can be recrystallized from ethyl alcohol and then melts at 247–248° C. In analogous manner there are obtained the other salts of the above mentioned acids.

Example 2

2 parts by weight of 1-hydrazino-isoquinoline are dissolved in 25 parts by volume of 2-normal sodium acetate solution, and 2 parts by volume of acetone added. The resultant oily precipitate, when triturated, becomes crystalline. It is the 1-(N,N-dimethylmethylenehydrazino)-isoquinoline of the formula

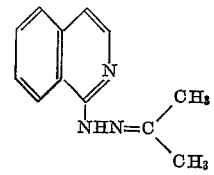

which after recrystallization from cyclohexane melts at 105–106° C.

What is claimed is:

1. A member selected from the group consisting of 1-hydrazino-isoquinoline, isoquinolines containing as sole substituent an N,N-methylene-hydrazino group in the 1-position, and therapeutically useful acid addition salts of the said isoquinolines.
2. 1-hydrazino isoquinoline.
3. Therapeutically useful acid addition salts of 1-hydrazino-isoquinoline.
4. The hydrochloride of 1-hydrazino isoquinoline.
5. 1-(N,N-dimethylmethylene-hydrazino)-isoquinoline.

References Cited in the file of this patent

Manske, Canadian J. Research 27B, 161–7 (1949).

Hoste et al., Mededel. Koninkl Vlaam. Acad. Wetens chap., Belg., Klasse Wentenschap, vol. 13, No. 12, pp. 3–12 (1951), abstracted in Chem. Abstr., vol. 46, col. 5474 (1952).